W. SEIDEL.
RESILIENT WHEEL.
APPLICATION FILED JULY 31, 1914.
1,166,155.
Patented Dec. 28, 1915.
2 SHEETS—SHEET 2.
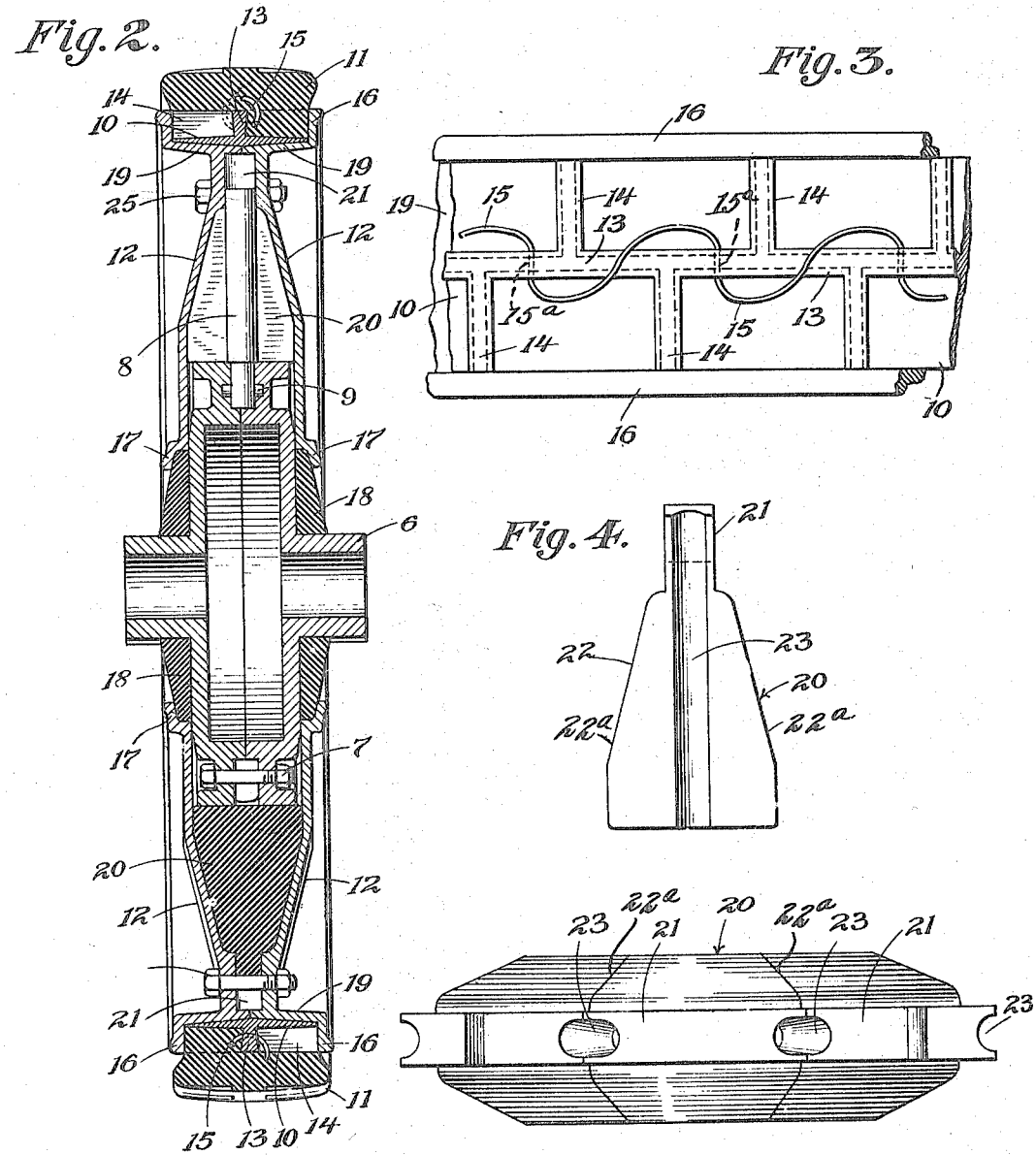
Witnesses:
Harry S. Gather
Wm. P. Bond
Inventor:
William Seidel
By Ranney & Ranney
Atty's

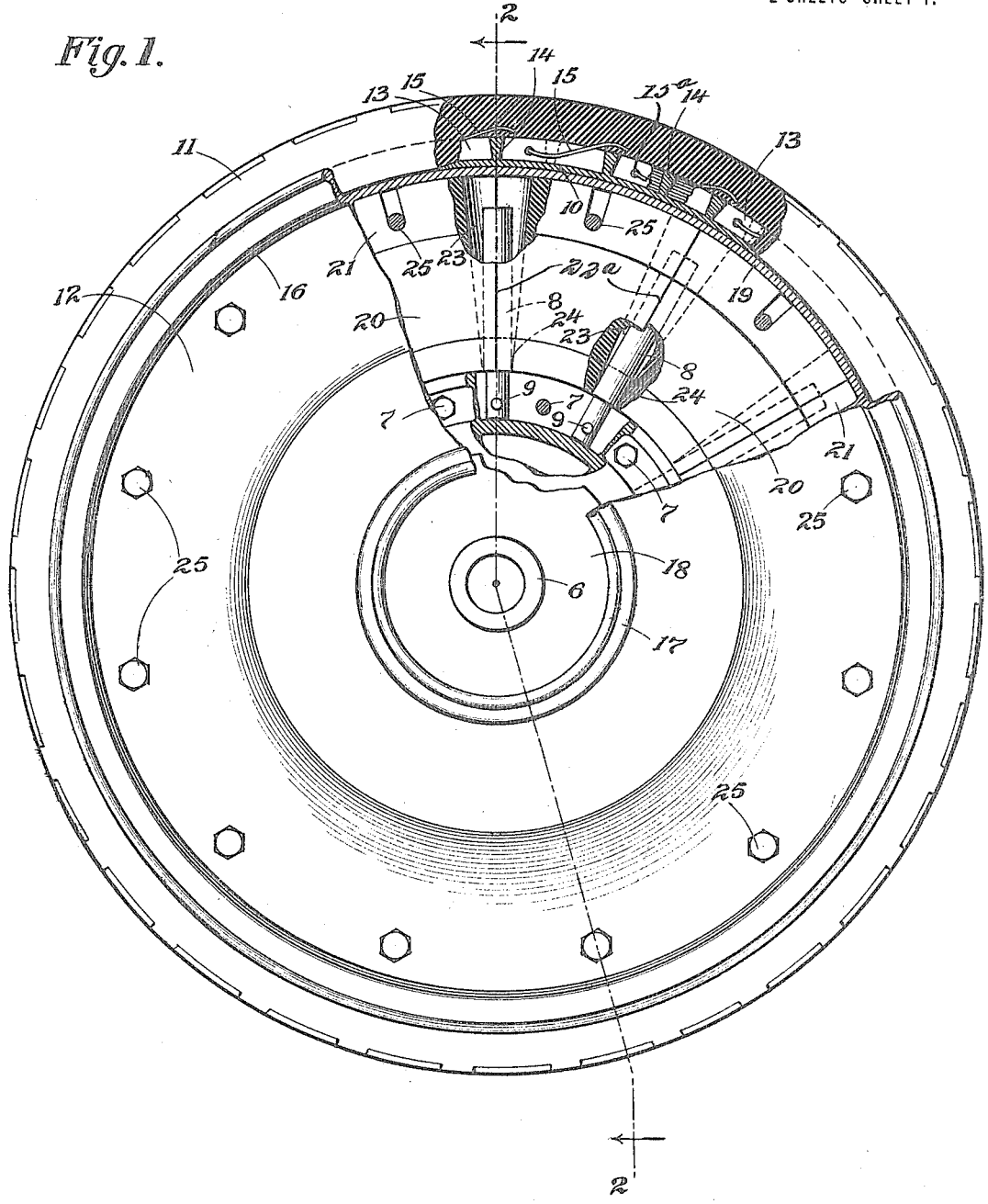

UNITED STATES PATENT OFFICE.

WILLIAM SEIDEL, OF CHICAGO, ILLINOIS.

RESILIENT WHEEL.

1,166,155.  Specification of Letters Patent.  Patented Dec. 28, 1915.

Application filed July 31, 1914. Serial No. 854,422.

*To all whom it may concern:*

Be it known that I, WILLIAM SEIDEL, a citizen of the United States, residing at Chicago, in the county of Cook and State of Illinois, have invented certain new and useful Improvements in Resilient Wheels, of which the following is a specification.

The present invention relates to a resilient wheel of the non-pneumatic type, and is arranged and adapted particularly for use with automobiles and similar vehicles.

The objects of the present invention are to provide a wheel formed with cushioning material intended to absorb shocks; to eliminate the use of springs or analogous parts which would be likely to crystallize with wear and break; and to so arrange the sections of cushioning substance as to provide the necessary driving connection for the wheel and at the same time eliminate any danger of the rubber being unduly compressed and losing its resilient property.

A further object of the invention is to arrange the different portions of the wheel so as to permit of the easy assemblance and disassemblance of the parts forming the same.

The invention further consists in the features of construction and combinations of parts hereinafter described and claimed.

In the drawings, Figure 1 is a side elevation of the wheel of the present invention with a portion broken out; Fig. 2 is a section on line 2—2 of Fig. 1 looking in the direction of the arrow; Fig. 3 is a detail showing the outer surface of the outer rim; Fig. 4 is an end view of the intermediate resilient blocks; Fig. 5 is a perspective view of a plurality of said blocks.

Referring now to the drawings, and particularly to Figs. 1 and 2, the device consists of an inner or hub section 6 which, as shown, is formed in two sections joined together by suitable fastening members 7, and into the outer end of this hub section is attached a series of radially extending spokes 8, said spokes being secured to the hub by means of pins 9 or otherwise. The hub, together with the spokes attached thereto, really forms the inner section of the wheel, and such section is immovable diametrically with respect to the axle of the wheel. The outer section comprises a metallic rim 10, a tread 11 and plates 12, and this section is movable diametrically with respect to the axle.

The tread 10 is better illustrated in Fig. 3 and consists of a circumferentially extending V-shaped flange 13 with the large end of the V outward and cross flanges 14, also of V formation, with the large part uppermost, and said cross flanges are arranged as shown in staggered relation to one another. The effect of the cross flanges is to create a series of pockets on the outer surface of the rim, the walls of said pockets taper downward so that the area of each pocket is enlarged at the bottom thereof, and if desired a spiral spring 15 may be inserted through openings 15ª in the circumferential flanges 13, as is shown in Fig. 3. To this rim is molded the tread 11, which is of rubber or similar resilient material, and the ribs or flanges 13 and 14, together with the spring 15, serve to retain this tread in place.

The plates 12 are in the form of circular disks and, as shown, have a portion 16 which embraces the rim as shown in Fig. 2, and form the entire flanges of the rim; the plates then depend inward and are of a diverging formation, and, as will be seen from Fig. 2, the plates terminate at their lower or inner edge in a bead or shoulder 17, and interposed between this shoulder and the hub of the wheel are resilient collars or disks 18, which may be referred to as the inner resilient sections. It is understood that there are two plates and two resilient disks 18 in the complete wheel. The tread and rim, together with the plates, are all movable diametrically with respect to the axle of the wheel, and constitute the outer or movable section of the wheel.

Extending from the upper end of the hub 9 to the top portion 19 of the plates 12 are a series of blocks 20 radially arranged, each block being similar in formation and better illustrated perhaps in Figs. 1, 4 and 5. They consist of an upper stem 21 and a body 22 with diverging sides 22ª. Located at each end of the blocks 20 is an opening or groove 23 which is of increased depth at its outer end, as will be understood by referring to Figs. 1 and 5. When the blocks are arranged end to end these grooves 23 form bores in which lie the spokes, and, as will be seen from Fig. 1, there is one of the bores provided for each spoke, and when the wheel is in normal position the spokes have contact with the blocks 20 only at the lower ends 24 of said blocks, and there is considerable play between the upper portions of the spoke and the walls of the openings or grooves through the blocks. This is provided so that when the spokes exert their pressure to transmit movement from the inner to the outer section of the wheel they will not unduly compress the blocks. If there were a positive engagement between the entire length of the spoke and the block the pressure of the spoke upon the block would tend to harden and take away the resiliency of the block and destroy its function as a shock absorber. Compressive and expansive action of the blocks 20 is not interfered with by the engagement of the spokes therewith. Said spokes engaging the walls of the openings 23 in the blocks only at the lower end of said walls, leaving a clearance between the spokes and walls for the remainder of the opening, which clearance allows the blocks to contact and expand without binding against the spokes and at the same time tractive engagement between the spokes and blocks is maintained by the engagement of the spokes with the walls of the openings 23 at the lower end of said openings.

When an obstruction is met the shock will be absorbed by compression of the tread 11, the blocks 20 and the rings 18, so that there are three points of shock absorption before the shock is transmitted to the axle of the wheel. The plates are maintained in position by means of suitable locking members 25. These locking members are arranged alternately with respect to the opening 23, as will be apparent from Fig. 1. From the foregoing it will be seem that the wheel is simple and strong of construction; involves no springs which would be open to the criticism of becoming crystallized and breaking, and is efficient for shock absorbing purposes and is easily assembled and disassembled.

I claim:

1. In a resilient wheel, the combination of an inner section held against eccentric movement with respect to the axle of the wheel, an outer section movable eccentrically with respect to said axle, a series of spokes radiating from the inner section, an outer section of resilient material between the outer face of the inner wheel section and inner face of the outer wheel section, an inner section of resilient material interposed between the inner face of the outer wheel section and inner face of the inner wheel section, and a series of openings in the outer resilient section for receiving said spokes, substantially as described.

2. In a resilient wheel, the combination of an inner section held against eccentric movement with respect to the axle of the wheel, an outer section movable eccentrically with respect to said axle, a series of spokes radiating from the inner section, an outer section of resilient material between the inner and outer sections of the wheel, said outer resilient section comprising a series of blocks, an outwardly tapering groove at each end of said blocks forming when the blocks are assembled an outwardly tapered bore, said spokes extending into said bores and being spaced away from the outer portions of the walls of said bores, and an inner section of resilient material between the outer and inner sections of the wheel, substantially as described.

WILLIAM SEIDEL.

Witnesses:
WM. P. BOND,
THOMAS A. BANNING, Jr.